No. 788,076. Patented April 25, 1905.

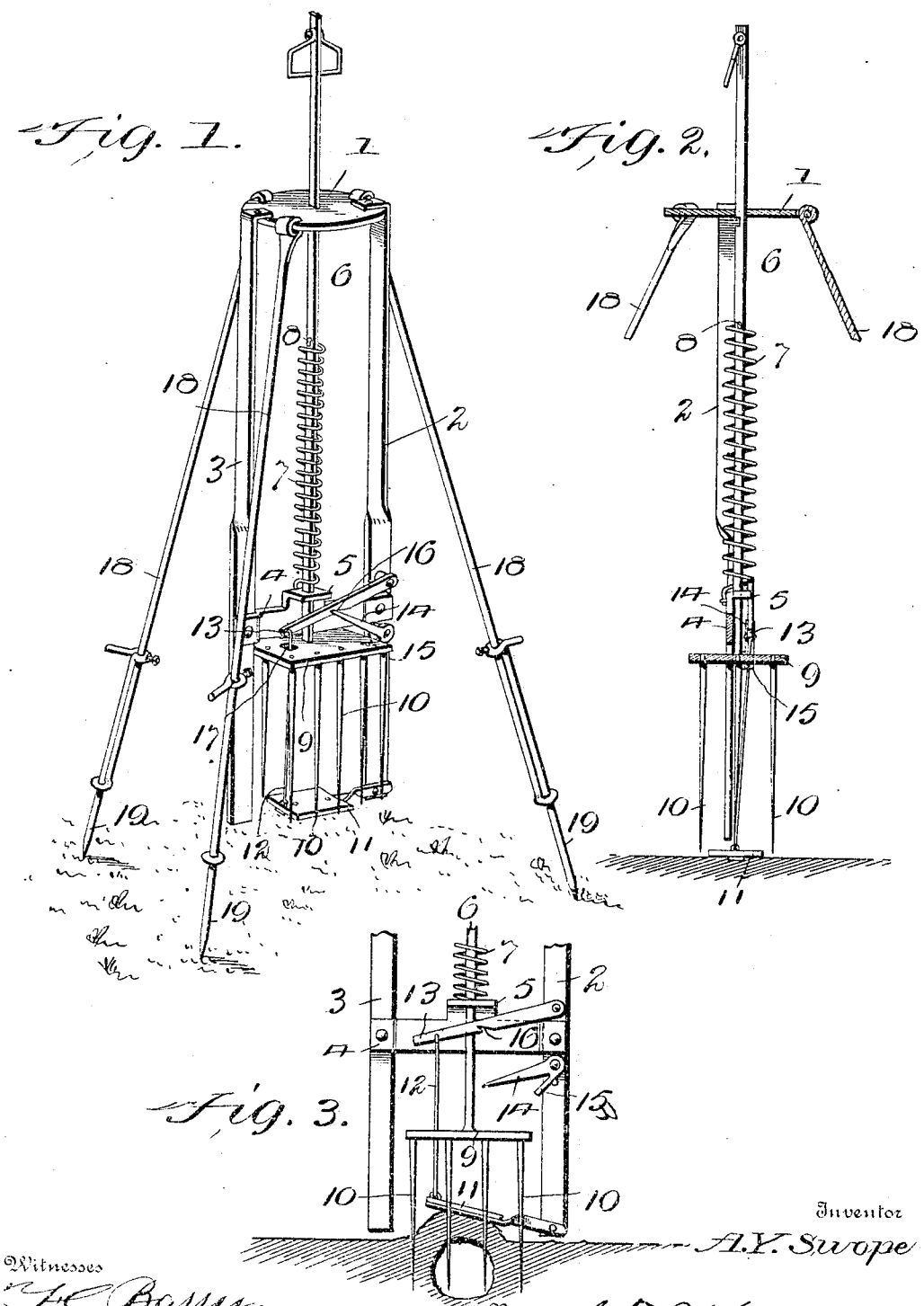

UNITED STATES PATENT OFFICE.

ABIJAH Y. SWOPE, OF WINLOCK, WASHINGTON.

MOLE-TRAP.

SPECIFICATION forming part of Letters Patent No. 788,076, dated April 25, 1905.

Application filed August 1, 1904. Serial No. 219,075.

*To all whom it may concern:*

Be it known that I, ABIJAH Y. SWOPE, a citizen of the United States, residing at Winlock, in the county of Lewis and State of Washington, have invented certain new and useful Improvements in Mole-Traps; and I do hereby declare the following to be a full, clear, and exact description of the invention, such as will enable others skilled in the art to which it appertains to make and use the same.

My invention relates to traps for catching burrowing animals, as moles, &c.; and it consists of certain novel features of combination and construction of parts, the preferred form whereof will be hereinafter particularly set forth, and pointed out in the claim.

The prime object of my invention, among others, is to provide a trap of the character specified which will possess absolute reliability and efficiency and which may be quickly disposed in its operative position or removed therefrom.

Other objects and advantages will be hereinafter made clearly apparent, reference being had to the accompanying drawings, which are made a part of this application, and in which—

Figure 1 shows a perspective view of my mole-trap complete ready for use. Fig. 2 is a transverse section of Fig. 1. Fig. 3 is a detail view showing the teeth of the trap sprung or in a released position.

For convenience of reference to the various details and coöperating accessories of my invention numerals will be employed, the same numeral applying to a similar part throughout the several views, and, referring to the numerals on the drawings, 1 indicates the main or body portion of my invention, which comprises the top part of the framework of my mole-trap, while 2 and 3 designate depending arms connected together near their lower ends by the cross-bar 4, which latter is provided with the laterally-directed lip 5, through an aperture in which the lower end of the plunger-shaft 6 is designed to play incident to the operation of my trap. The upper end of the plunger or shaft 6 passes loosely through an aperture in the top section 1 of the framework, and in order to hold the shaft or plunger normally down I provide the retraction-spring 7, which is extended around a portion of the shaft, while the upper end of said spring is passed through an aperture in said shaft, as indicated by the numeral 8. The lower end of the spring 7 rests upon the laterally-extending plate or bracket 5, and it is therefore obvious that the tension of said spring is directed to force the shaft downward.

Upon the lower end of the plunger 6 I secure the cross-head or tooth-carrying bar 9, having a plurality of downwardly-extending sharpened teeth 10, as clearly shown, said teeth being preferably arranged in pairs and sharpened, so as to take deeply into the earth and pierce through the mole-burrow at different points.

Suitable trigger mechanism is provided to sustain the cross-bar 9 and shaft 6 in an elevated position, and I therefore call attention to the construction shown in Figs. 1 and 3, wherein it will be observed that I have provided at the lower end of the standard or member 2 a trigger 11, the outer end of which is pivotally connected to the bracket 2, while the inner end is pivotally attached, by means of the link-section 12, to the trigger-bar 13, also pivoted at its outer end to the arm or bracket 2. Said arm or bracket also carries the pivotally-mounted detent 14, having an inwardly-directed finger 15 on its lower side, said detent 14 being designed to have its free end rest in a recess 16, provided in the trigger-bar 13. It will be seen that the link 12 extends loosely through an aperture 17 in the bar or cross-head 9, and said cross-head and the teeth carried thereby may therefore be freely raised and lowered incident to the operation of the trap. The office of the finger 15 is to engage the contiguous end of the bar or cross-head 9 when the trap is in a set condition.

It will be seen that I have also provided a plurality of supporting-legs 18, preferably having adjustable extensions 19, whereby the trap may be adjusted in any desired height and accommodated to the uneven surface of the ground.

In setting the trap the trigger or member 11 is buried so as to extend transversely across the burrow made by the mole or so as to occupy the upper portion of said burrow, so that when the mole passes along it will move under the trigger and cause the elevation thereof sufficient to release the detent 14 from the recess 16, and the contraction of the retracting-spring 7 will force the cross-head and the teeth carried thereby violently downward, and thereby cause the impalement and destruction of the mole beneath the trigger 11.

It will be seen that I have provided a reliably-efficient form of trap for catching burrowing animals, the parts of which may be cheaply and expeditiously manufactured and each readily assembled in its respective operative position, and while I have described the preferred combination and construction of parts I desire to comprehend in this application all substantial equivalents and substitutes that may be considered as falling fairly within the scope of my invention.

Having thus fully described my invention, what I claim as new, and desire to secure by Letters Patent, is—

The herein-described trap comprising the main or body portion 1, having depending arms or brackets 2 and 3 rigidly secured thereto, supporting-legs, the upper ends of which are pivotally secured to said body portion, extensions adjustably secured to the lower ends of said supporting-legs, whereby the trap may be properly adjusted on uneven ground, a cross-bar uniting said depending brackets 2 and 3, said cross-bar having a laterally-directed lip, a shaft playing loosely through an opening in said bar and the member 1 and having on its lower end a cross-head provided with a plurality of projections or teeth 10, a trigger adapted to be disposed in the path or burrow of the mole, a detent having a finger 15 adapted to engage said cross-head and hold the teeth elevated, and devices intermediate said detent and trigger designed to release the detent when the trigger is elevated, and a spring surrounding said shaft, one end of which is secured to said shaft and the opposite end to said laterally-directed lip, all combined substantially as specified and for the purpose set forth.

In testimony whereof I have signed my name to this specification in the presence of two subscribing witnesses.

ABIJAH Y. SWOPE.

Witnesses:
  OSCAR BACKMAN,
  E. J. DOTY.